United States Patent
Hainz et al.

(10) Patent No.: US 7,541,802 B2
(45) Date of Patent: Jun. 2, 2009

(54) METHOD AND APPARATUS FOR EVALUATING A SENSOR SIGNAL ASSOCIATED WITH A ROTATING OBJECT

(75) Inventors: Simon Hainz, Villach (AT); Dirk Hammerschmidt, Villach (AT); Tobias Werth, Villach (AT)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 11/636,178

(22) Filed: Dec. 8, 2006

(65) Prior Publication Data
US 2008/0136406 A1  Jun. 12, 2008

(51) Int. Cl.
  G01R 33/025 (2006.01)
  G01B 7/30 (2006.01)
  G01P 3/487 (2006.01)
(52) U.S. Cl. .................... 324/207.12; 324/207.25; 324/173
(58) Field of Classification Search ...............
  324/207.15–207.17, 207.2, 207.21–207.25, 324/166, 167, 173, 174, 178–180, 207.12
See application file for complete search history.

(56) References Cited

U.S. PATENT DOCUMENTS 5,998,954 A  12/1999 Scholten
2005/0040814 A1*  2/2005  Vig et al. ............... 324/179
2006/0071659 A1*  4/2006  Tatschl et al. .......... 324/207.25
2007/0114988 A1*  5/2007  Rossmann et al. ....... 324/207.2

FOREIGN PATENT DOCUMENTS

DE  69713862 T2  7/2004

* cited by examiner

Primary Examiner—Kenneth J Whittington
(74) Attorney, Agent, or Firm—Dicke, Billig & Czaja, PLLC

(57) ABSTRACT

A method for evaluating a sensor signal provided by a magnetic field sensor which is arranged at a distance from an object which is rotatable about an axis of rotation. The method includes defining an encoding pattern with a sequence of symbols, the sensor signal being dependent on the encoding pattern and at least one transmission parameter; regenerating the symbols of the encoding pattern from a corrected sensor signal using a threshold value detector to obtain an output signal; generating a filtered signal from the output signal using a filter having a plurality of filter coefficients; superposing the sensor signal and the filtered signal to obtain the corrected sensor signal; and wherein the corrected sensor signal and the output signal are used to estimate the at least one transmission parameter, and the filter coefficients are derived from the estimated transmission parameter.

14 Claims, 5 Drawing Sheets

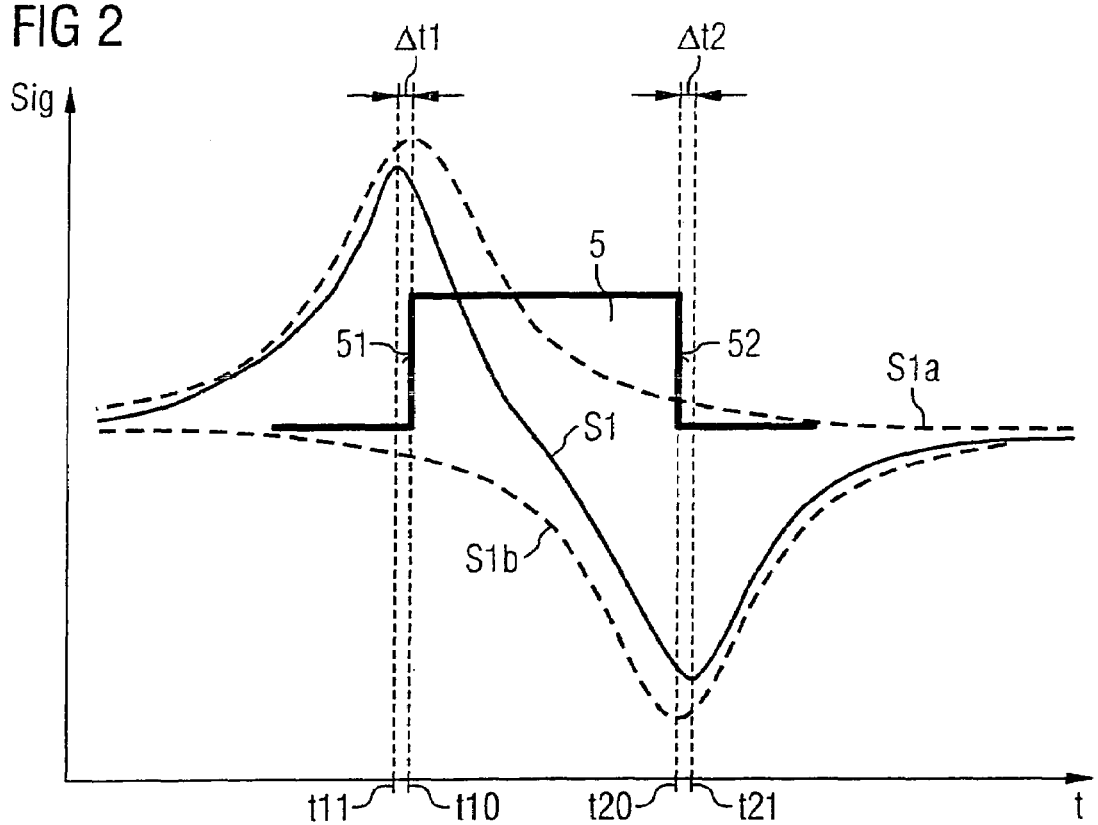
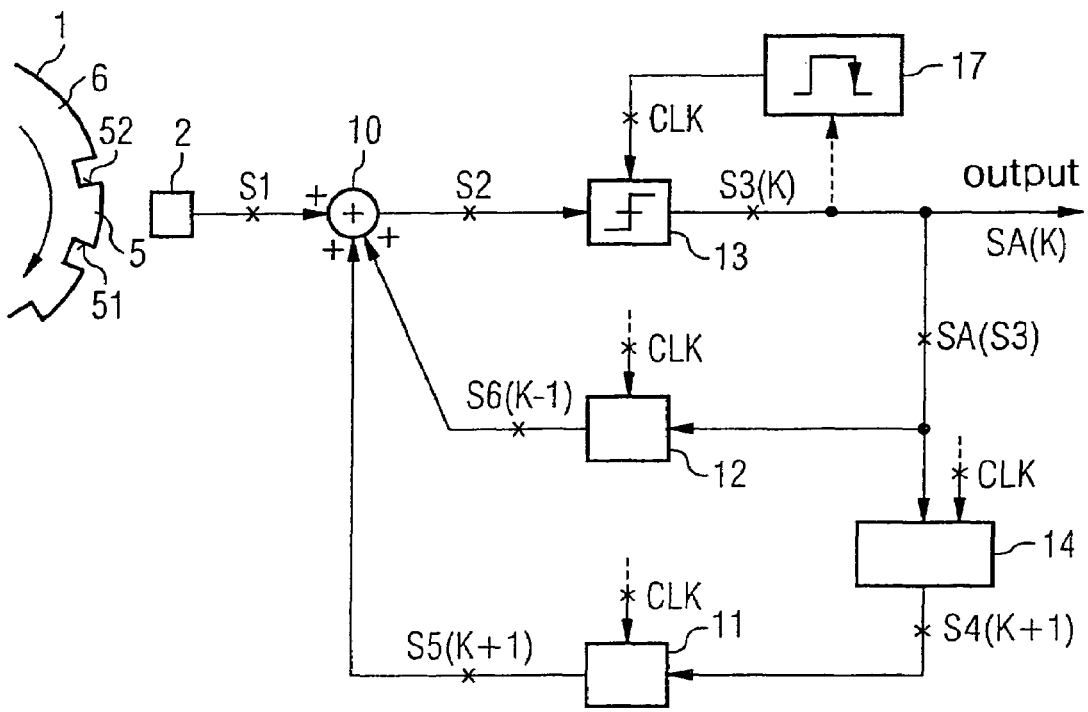

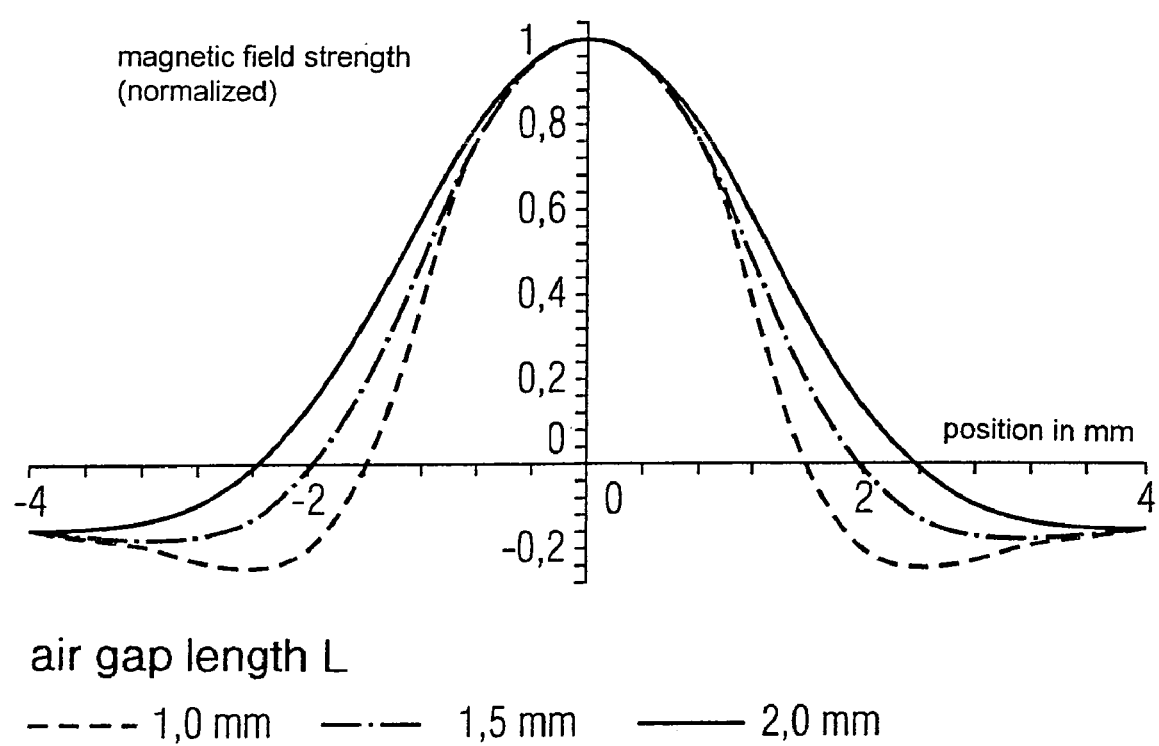

METHOD AND APPARATUS FOR EVALUATING A SENSOR SIGNAL ASSOCIATED WITH A ROTATING OBJECT

CROSS REFERENCE TO RELATED APPLICATION

This Utility Patent Application claims priority to German Patent Application No. DE 10 2006 049 362.1 filed on Oct. 19, 2006, which is incorporated herein by reference.

BACKGROUND

The invention relates to a method for identifying the angular position of a rotating object, such as a rotating shaft in the field of vehicle engineering.

In many areas of engineering, the problem arises of determining the angular position of an object rotating about an axis of rotation as accurately as possible. One widely used method in this regard involves providing the rotating object with a suitable encoding pattern which is scanned by means of a sensor so as to obtain information about the angular position of the rotating object. The encoding pattern, which is a sequence of binary symbols, is usually detected by the sensor contactlessly, for example when using a magnetic encoding pattern and a magneto-sensitive sensor.

A "Predictive Decision Feedback Equalizer" (pDFE) may be used in order to regenerate the encoding pattern of the rotating object from a measurement signal and to eliminate intersymbol interferences which are present in the measurement signal, the encoding pattern being regarded as a sequence of binary symbols.

For this purpose an output signal is supplied to a plurality of (e.g. digital) filters and the filtered signals are superposed with a sensor signal. The output signal is thus fed back to the sensor signal. The filter characteristic and hence the filter coefficients of the aforementioned filters can be predetermined constants or else can be adaptively adjusted in order to react to changes in the sensor arrangement.

For these and other reasons, there is a need for the present invention.

SUMMARY

One embodiment provides a method for evaluating a sensor signal provided by a magnetic field sensor which is arranged at a distance from an object which is rotatable about an axis of rotation. The method includes defining an encoding pattern with a sequence of symbols, the sensor signal being dependent on the encoding pattern and at least one transmission parameter; regenerating the symbols of the encoding pattern from a corrected sensor signal using a threshold value detector to obtain an output signal; generating a filtered signal from the output signal using a filter having a plurality of filter coefficients; superposing the sensor signal and the filtered signal to obtain the corrected sensor signal; and wherein the corrected sensor signal and the output signal are used to estimate the at least one transmission parameter, and the filter coefficients are derived from the estimated transmission parameter.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description.

The components in the figures are not necessarily to scale, instead emphasis being placed upon illustrating the principles of the invention. Moreover, in the figures, like reference numerals designate corresponding parts. In the drawings:

FIG. 2 illustrates the profile of a signal which is provided by a sensor scanning the rotating disk shown in FIG. 1b, based on the prior art.

FIG. 3 illustrates a block diagram of an apparatus for evaluating the sensor signal which operates on the basis of a predictive Decision Feedback Equalizer (pDFE).

FIG. 6 illustrates the dependency of the sensor signal on a transmission parameter.

DETAILED DESCRIPTION

Figure 1B:
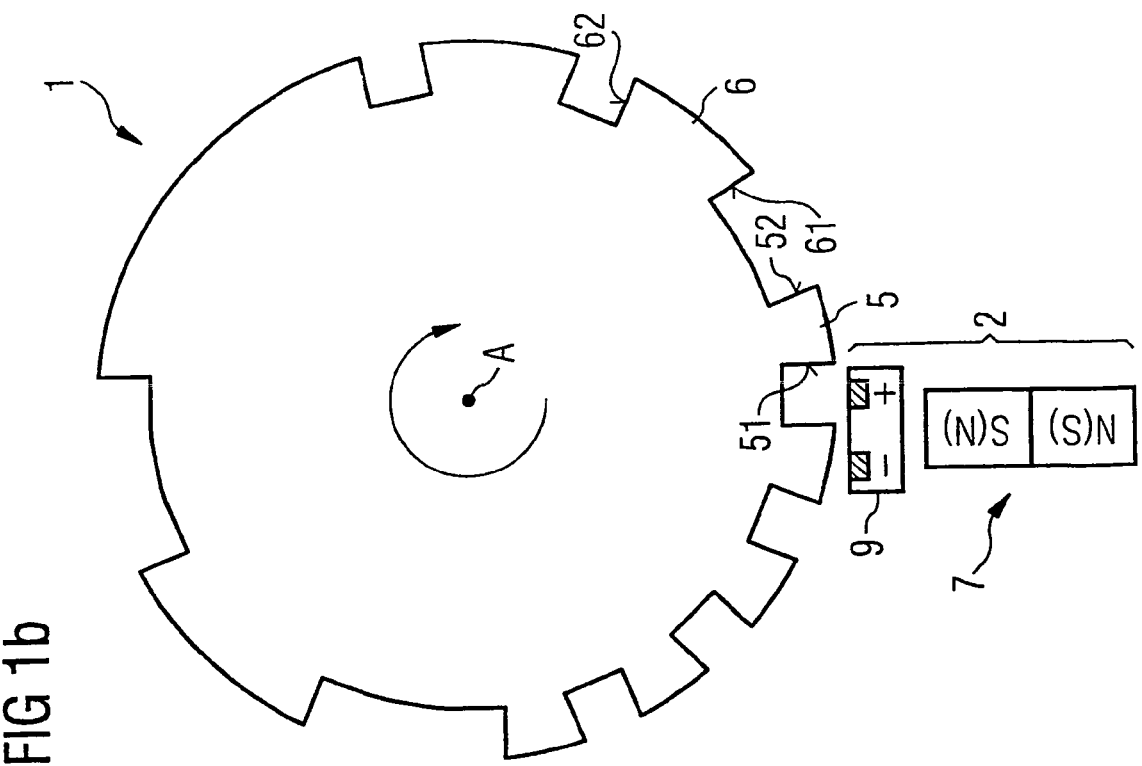
FIG. 1b illustrates a cross section of a rotating disk based on the prior art whose encoding pattern is formed from a succession of teeth and intermediate gaps.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment uses a physical model underlying the measurement problem to calculate the filter coefficients. An algorithm using a physical model can be much more efficient and robust than an abstract, mathematical optimization method (such as a Downhill Simplex method, a gradient method or a Newton method) for the optimization of the filter coefficients in the case of a "Predictive Decision Feedback Equalizer" (pDFE). Such a model is dependent only on a few (or else only on a single) transmission parameter(s). Such a transmission parameter is usually—but not necessarily—a physical variable, such as the air gap length or the magnetic field strength for measuring a magnetic encoding pattern using a magnetic field sensor.

An error signal which is to be minimized is calculated from a sensor signal (and/or signals derived therefrom) in similar fashion to the aforementioned mathematical optimization methods. In contrast to known methods, however, there is no direct variation of the filter coefficients in order to minimize the error signal but rather merely the aforementioned transmission parameters are varied and the filter coefficients are calculated therefrom using the physical model which is dependent on the transmission parameters. The calculated filter coefficients replace the original filter coefficients, whereupon the error signal changes. The transmission parameters are then varied in targeted fashion until the error signal (or a norm of the error signal) has reached a minimum.

"Interposing" an estimation of the transmission parameters, from which the filter coefficients are calculated in turn, has significant advantages over known optimization methods. Thus, by way of example, the relationship between a transmission parameter and the error signal on both sides of the optimum is usually monotonous. The result of this is that the correct transmission parameters and hence the optimum filter coefficients are found rapidly in a few iteration steps. There is also no risk of nonunique solutions and "getting stuck" at local minima for the error signal in that case. Since only a few transmission parameters have to be varied instead of a large number of filter coefficients, the computation complexity is much reduced over that of known methods, which in turn significantly simplifies the implementation of the method in an application-specific integrated circuit (ASIC).

The adaptive filtering described above is used as part of a method for evaluating a sensor signal from a magnetic field sensor. The magnetic field sensor is arranged at a distance from an object which is rotatable about an axis of rotation and which has an encoding pattern with a sequence of symbols, the sensor signal being dependent on the encoding pattern and at least one transmission parameter and being distorted by intersymbol interferences. The method includes:

regenerating the symbols of the encoding pattern from a corrected sensor signal by the use of a threshold value detector in order to obtain an output signal, generating a filtered signal from the output signal by the use of a filter having a plurality of filter coefficients, superposing the sensor signal with the filtered signal in order to obtain the corrected sensor signal.

The transmission parameter is estimated from the corrected sensor signal and from the output signal. The filter coefficients are in turn derived from the estimated transmission parameter.

The filter coefficients may have predetermined initial values. These initial values can also be ascertained by additional measurements or prior adaptation steps. The initial values are then optimized in the course of the method by:

generating an error signal from the corrected sensor signal and the output signal, calculating an estimated transmission parameter using a physical model which is dependent on the transmission parameter and which describes the response of the sensor signal to the encoding pattern, such that the error signal is minimized.

This estimation of a transmission parameter which minimizes the error signal is an iterative process which can be described by the following steps:

calculating an error signal from the corrected sensor signal and the output signal, updating transmission parameters by varying the previous transmission parameters, calculating updated filter coefficients from the updated transmission parameters using the physical model.

This process is repeated until the error signal has reached a minimum or are continued the whole time. The variation of the transmission parameters is naturally not done randomly but rather follows a particular strategy. The updated value of the transmission parameters could be calculated using a gradient method, for example. The adaptation can naturally also continue after the optimum has been found and hence can react to changes in the transmission parameters.

In one embodiment of the invention, the physical model is dependent only on a single transmission parameter, for example the air gap between a multipole wheel and a magnetic field sensor. The physical model can naturally be refined. In another embodiment, other transmission parameters are taken into account, for example the air gap and the magnetic field strength within the air gap. In addition, the calculation of the filter coefficients can also include other measured variables, such as the temperature. The physical model can be generated from measured data and/or from mathematical relationships.

One basic structure of a method for identifying the angular position of an object rotating about an axis A is explained below with reference to FIGS. 1 to 3. In this embodiment, the circumference of the object 1 rotating about the axis of rotation A has a number of bar magnets 3, 4 arranged around it whose longitudinal axis is arranged in the radial direction of the rotating object 1. The rotating object 1, in the case illustrated in FIG. 1a a magnetic multipole wheel, has an encoding pattern which is dependent on the orientation of the individual bar magnets 3, 4. The individual bar magnets 3, 4 generate magnetic fields which are superposed to form a total magnetic field. The total magnetic field is scanned by a sensor 2 when the rotating object rotates about its axis, so as to infer therefrom the angular position of the rotating object relative to the sensor 2.

The sensor 2 is a magnetic field sensor 9, for example a Hall sensor 8.

With reference to FIG. 1b, the circumference may also have teeth 5, 6 arranged around it in similar fashion to the teeth of a gearwheel. However, these teeth 5, 6 generally have different widths. Accordingly, the gaps between two teeth 5, 6 which are at a distance from one another in the circumferential direction are also of different size in general. The teeth 5, 6 and the intermediate gaps form an encoding pattern for the rotating object 1.

The encoding pattern is scanned using a sensor 2 which includes a magnetic field sensor and a magnet 7.

The rotating object 1 is formed from magnetic material, which means that the magnetic field which comes from the magnet 7 and which is altered on the basis of the encoding pattern formed by the teeth 5, 6 during rotation of the rotating object 1 can be ascertained using the magnetic field sensor 9.

Figure 1A:
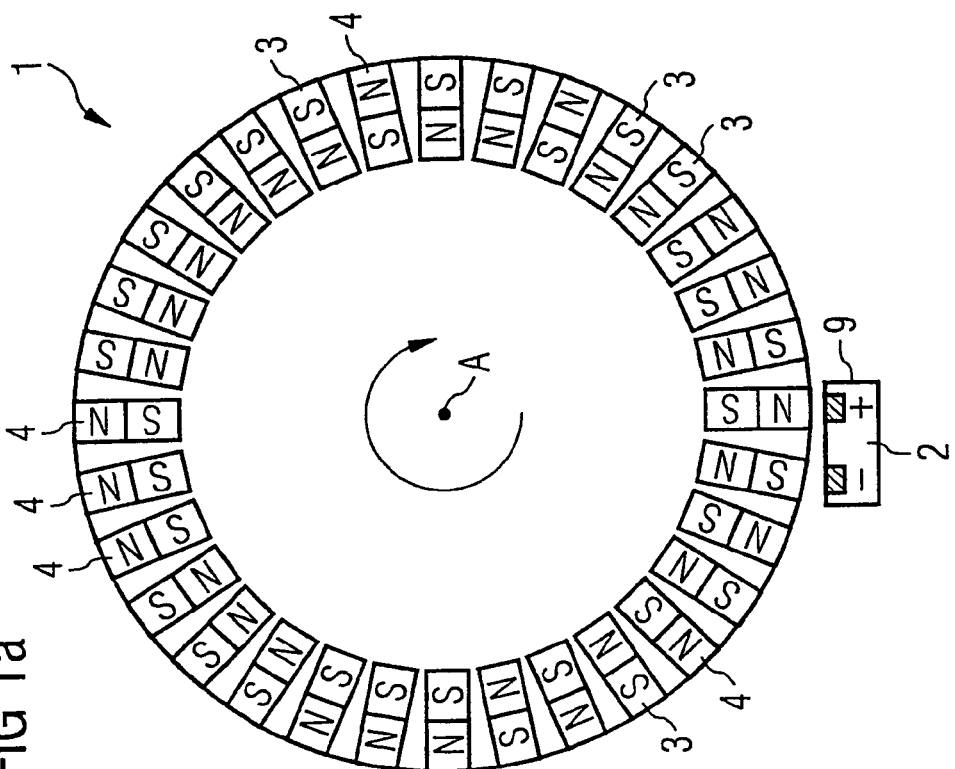
FIG. 1a illustrates a cross section of a magnetic multipole wheel based on the prior art with a magnetic encoding pattern which is measured by a magnetic field sensor.

The magnetic field sensor 9 illustrated in FIGS. 1a and 1b may be a Hall element, a GMR (Giant Magnetic Resistor) sensor or coil, for example. The sensor 2 has an analog output which may be either in the form of a differential output or in the form of a single-ended output.

When the rotating object 1 illustrated in FIG. 1b rotates about its axis A in the direction of the arrow, first of all the tooth 5 and then the tooth 6 pass the sensor 2. The tooth 5 will now be considered by way of example. The tooth 5 has a first tooth flank 51 and a second tooth flank 52. When the rotating object 1 is rotating, first of all the first tooth flank 51 and then the second tooth flank 52 pass the sensor 2. Whenever a tooth flank 51, 52 passes, the sensor outputs a signal.

FIG. 2 illustrates the typical profile of such a signal S1, as is output by the sensor 2, when the tooth flanks 51, 52 pass this sensor 2 at successive times. The sensor signal S1 is a sum signal which is formed by superposing a plurality of signal elements, of which the signal elements S1a and S1b are shown by way of example.

The signal element S1a corresponds to the signal component which is brought about by the flank 51, that is to say corresponds to a signal which would be output by the sensor 2 if the rotating object 1 were to have only the tooth flank 51 as a single tooth flank instead of a plurality of tooth flanks 51, 52. The theoretical profile of this signal element S1a is dependent on a plurality of physical parameters (e.g. temperature, air gap, etc.). The profile of S1a in FIG. 2 is accordingly just an example to improve understanding.

Accordingly, the curve element S1b indicates what the appearance of the signal S1 which is output by the sensor 2 would be if the rotating object 1 were to have only the second tooth flank 52. Accordingly, the other teeth 6 of the rotating object 1 also have tooth flanks 61, 62, each of which can be allocated a signal element in the manner described. The sensor signal S1 is generated by superposing all of these signal elements.

The profile of the sensor signal S1 in the region of a tooth flank 51 is thus determined not only by the signal element S1a from the tooth flank 51 but also by the signal element S2a from the tooth flank 52 and by the signal elements from the tooth flanks of adjacent teeth.

As FIG. 2 reveals, the sensor signal S1 deviates from the profile of the respective signal elements S1a, S1b on account of this superposition, particularly in the region of the tooth flanks 51, 52. A particular signal element is influenced particularly by the relatively close environment of the tooth flank associated with the signal element in question. Since the teeth arranged around the circumference of the rotating object may have not only identical but also different tooth widths and tooth intervals, the signal elements from various tooth flanks are influenced by the respective environments of the tooth flanks in question generally to different extents, which means that on the basis of the sensor signal S1 the exact angular position of the rotating object 1 relative to the sensor 2 can first of all be ascertained only within the context of the deviations described.

These deviations can be explained as a consequence of intersymbol interference. The received signal S1a caused by a first tooth edge 51 is not (yet) zero at the position of the received signal S1b caused by a second tooth edge 52, and therefore causes intersymbol interference.

A block diagram of an apparatus known as a "Predictive Decision Feedback Equalizer" (pDFE) is depicted in FIG. 3. A rotating object 1, for example made of metal, has an encoding pattern which rotates together with this object 1. The encoding pattern is formed from teeth 5, 6 and gaps between the teeth, in similar fashion to a gearwheel.

A sensor 2 senses the encoding pattern—as already described with reference to FIG. 1b—and provides a sensor signal S1 which correlates to the encoding pattern. By way of example, the sensor signal S1 can be received at a clock rate CLK which is prescribed by a clock generator 17 and which has clock periods . . . , k−1, k, k+1, . . . . In order to identify a signal associated with a particular clock period more clearly, this signal is followed by the relevant clock period in brackets below. By way of example, SA(k) means the output signal SA associated with the clock period k.

The sensor signal S1 is supplied to an adder 10 whose output signal S2 is in turn supplied to a threshold value decoder 13.

On the basis of the signal S2 supplied to the threshold value decoder 13 and on the basis of the threshold stipulated in the threshold value decoder 13, said threshold value decoder provides an output signal S3 which in a rough approximation correlates to the encoding pattern from the rotating object 1 relative to the sensor 2. The current angular position can be derived from the encoding pattern. The output signal S3 from the threshold value decoder 13 also is the output signal SA from the circuit.

In addition, the output signal SA is supplied to a signal predictor 14 which stores the encoding pattern from the rotating object 1. The signal predictor 14 compares and synchronizes this stored encoding pattern with the pattern of the output signal SA, which correlates to the encoding pattern from the rotating object 1.

The signal predictor 14 therefore knows the approximate actual angular position and also the direction of rotation of the rotating object 1 relative to the sensor 2 and can infer therefrom the portion of the encoding pattern which the sensor 2 will shortly probably be sensing, i.e. if rotation continues and the direction of rotation is unchanged. On the basis of this, the signal predictor 14 provides a signal S4 which is supplied to a first filter 11.

Accordingly, the output signal SA is supplied to a second filter 12. Both filters 11, 12 are typically in the form of FIR filters and may have either identical or different filter properties, for example filter coefficients.

The first filter 11 provides an output signal S5 which, like an output signal S6 from the second filter 12, is supplied to the adder 10 and is added to the sensor signal S1. The output signal S2 from the adder 10 is thus formed from the sum of the output signal S1 from the sensor 2 and the output signals S5 and S6 from the filters 11 and 12.

With suitable adjustment of the first and second filters 11 and 12, the signals S5, S6 provided by these filters 11, 12 can correct the sensor signal S1 such that intersymbol interference contained in the sensor signal S1 is eliminated.

In this embodiment, the filter properties of the filters 11, 12 are normally determined by filter coefficients. These filter coefficients may be firmly prescribed, but it may be advantageous to adjust all or some of the filter coefficients dynamically, i.e. the filters 11, 12 are adaptive filters whose filter coefficients are adjusted using a particular algorithm. Therefor the current filter coefficients are used to calculate an error signal and the filter coefficients are adjusted on the basis of the error signal. The adjustment is made until an optimum has been reached for the error function.

Figure 4:
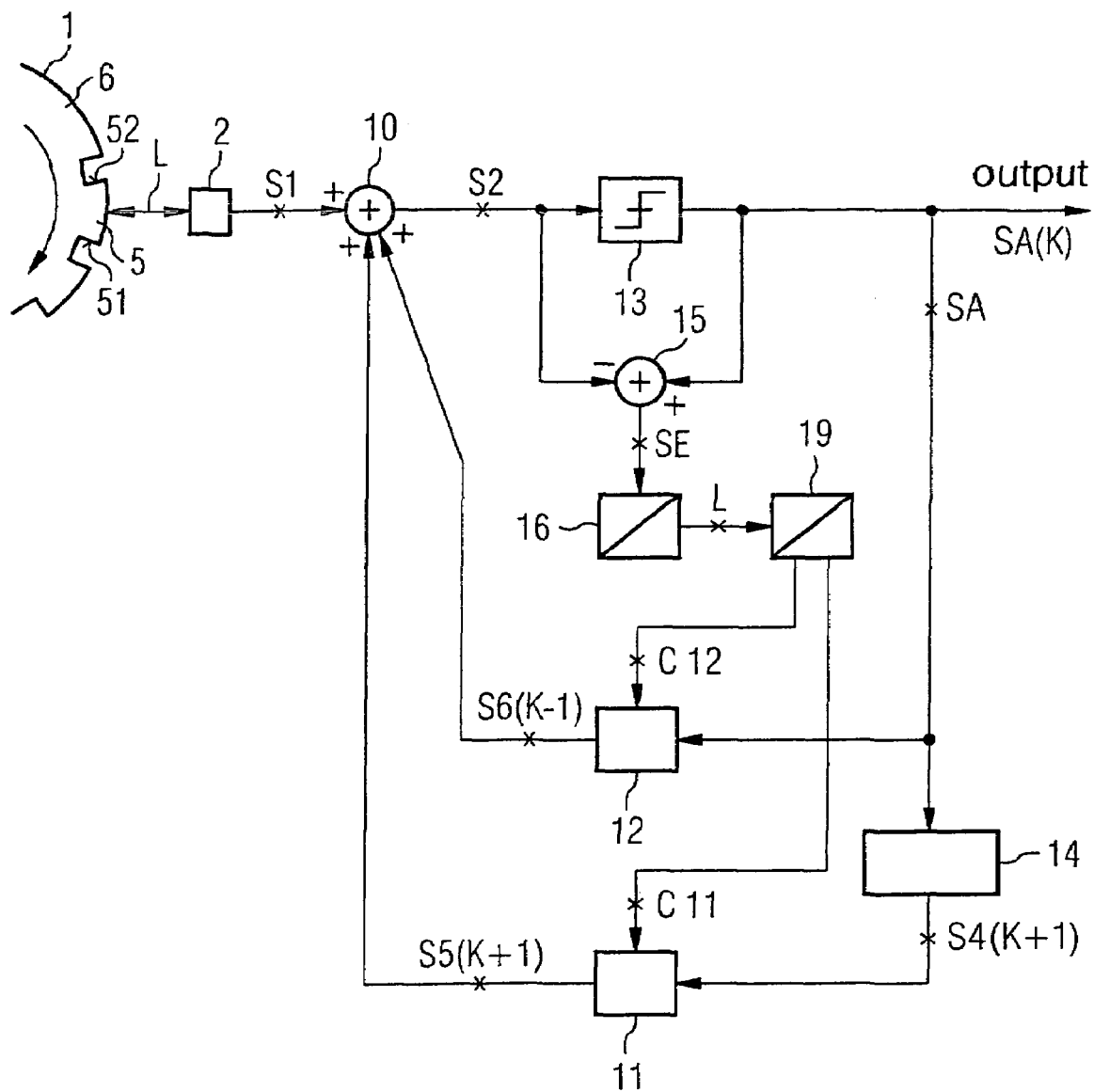
FIG. 4 illustrates a block diagram of one exemplary embodiment of an inventive apparatus for evaluating the sensor signal.

FIG. 4 illustrates a further development of the "Predictive Decision Feedback Equalizer" (pDFE) from FIG. 3. In this example, the rotating object 1 chosen is likewise a gearwheel, as is also illustrated in FIG. 1b. However, this can readily be replaced by a multipole wheel, as is illustrated in FIG. 1a, for example. The rotating object 1 has an encoding pattern which is formed by the teeth 5, 6 and the gaps situated between the teeth. A sensor 2 senses the encoding pattern and provides a sensor signal S1 which correlates to the encoding pattern. The sensor signal is received (as in FIG. 3) at a prescribed clock rate which is prescribed by a clock generator 17. For reasons of clarity, this clock generator 17 is no longer illustrated in FIGS. 4 and 5.

The sensor signal S1 is supplied to an adder whose output signal S2, which is a corrected sensor signal, is in turn supplied to a threshold value detector 13. The threshold value detector 13 regenerates the encoding pattern of the rotating object 1 from the corrected sensor signal S2 and makes it available as an output signal SA. To remove the aforementioned intersymbol interferences from the sensor signal S1, the output signal SA is fed back to the sensor signal S1 via filters 11, 12. The filtered signals S5 and S6 are (like the sensor signal S1) supplied to the adder 10, where they are superposed on the sensor signal S1. The output signal from the adder 10, i.e. the corrected sensor signal S2, corresponds to the sensor signal S1 corrected in terms of the influence of the intersymbol interference. At each scanning time, the sum of the signals S5 and S6 corresponds approximately to the negative value of that signal component of the sensor signal S1 which is caused by the intersymbol interference.

As already explained, this intersymbol interference is caused by the symbols which follow the currently received symbol and by the symbols which precede the current symbol. If signals which represent the preceding symbol and the symbol following the current symbol are successfully derived from the output signal SA, the intersymbol interference can be removed from the sensor signal through destructive interference with those derived signals. The result is a corrected sensor signal S2 which is free of intersymbol interference. A signal which represents the symbol preceding the current symbol (or which represents the preceding symbols) is provided by the filter 12. The latter's output signal is the filtered signal S6, which is in turn supplied to the adder 10. In order to eliminate the influence of the symbol which follows the current symbol, the output signal SA is supplied to a predictor 14. The latter's output signal S4 is in turn supplied to a filter 11. The output signal from the filter 11 is the filtered signal S5, which is likewise supplied to the adder 10. The filtered signal S5 represents the symbol which follows the current symbol (or represents the following symbols).

Both filters 11, 12 are typically in the form of FIR filters and may have either identical or different filter properties, i.e. filter coefficients C12, C11. The predictor 14 is therefore able to "predict" the following symbols, since it has a memory which stores the sequence of binary symbols of the encoding pattern.

The transfer function, i.e. the response of the sensor signal S1 to the encoding pattern of the rotating object is dependent on one or more transmission parameters, which can vary in the course of time. In addition, assembly and production tolerances mean that these transmission parameters will not be identical in every measurement arrangement. For this reason, it is also necessary to adjust the filter coefficients C11 of the filter 11 and the filter coefficients C12 of the filter 12 on the basis of the respective response of the encoding pattern to the sensor signal. This is done using a unit 16 for estimating the transmission parameter (or the transmission parameters) and a processor 19 for calculating the filter coefficients C11, C12 from the transmission parameters using a physical model.

Typically, the corrected sensor signal S2 and the output signal SA are supplied to a further adder (or subtracter) 15. Its output provides an error signal SE which is in turn supplied to the unit 16 for estimating the transmission parameter. The error signal can also be calculated from S2 and SA using a more complex function than addition. Furthermore, it is also possible to use additional signals such as S1, S5 and S6 for this purpose.

The unit 16 for estimating the transmission parameter makes the estimated transmission parameter available to the processor 19, which uses the physical model to recalculate the filter coefficients C11 for the filter 11 and the filter coefficients C12 for the filter 12 therefrom. While the error signal SE has not reached a minimum, targeted variation of the transmission parameter in the unit 16 for estimating the transmission parameter should result in a subsequent reduction in the error signal. The adjustment of the filter coefficients C12 and C11 is therefore an iterative process which lasts until the error signal SE has assumed a minimum.

Figure 5:
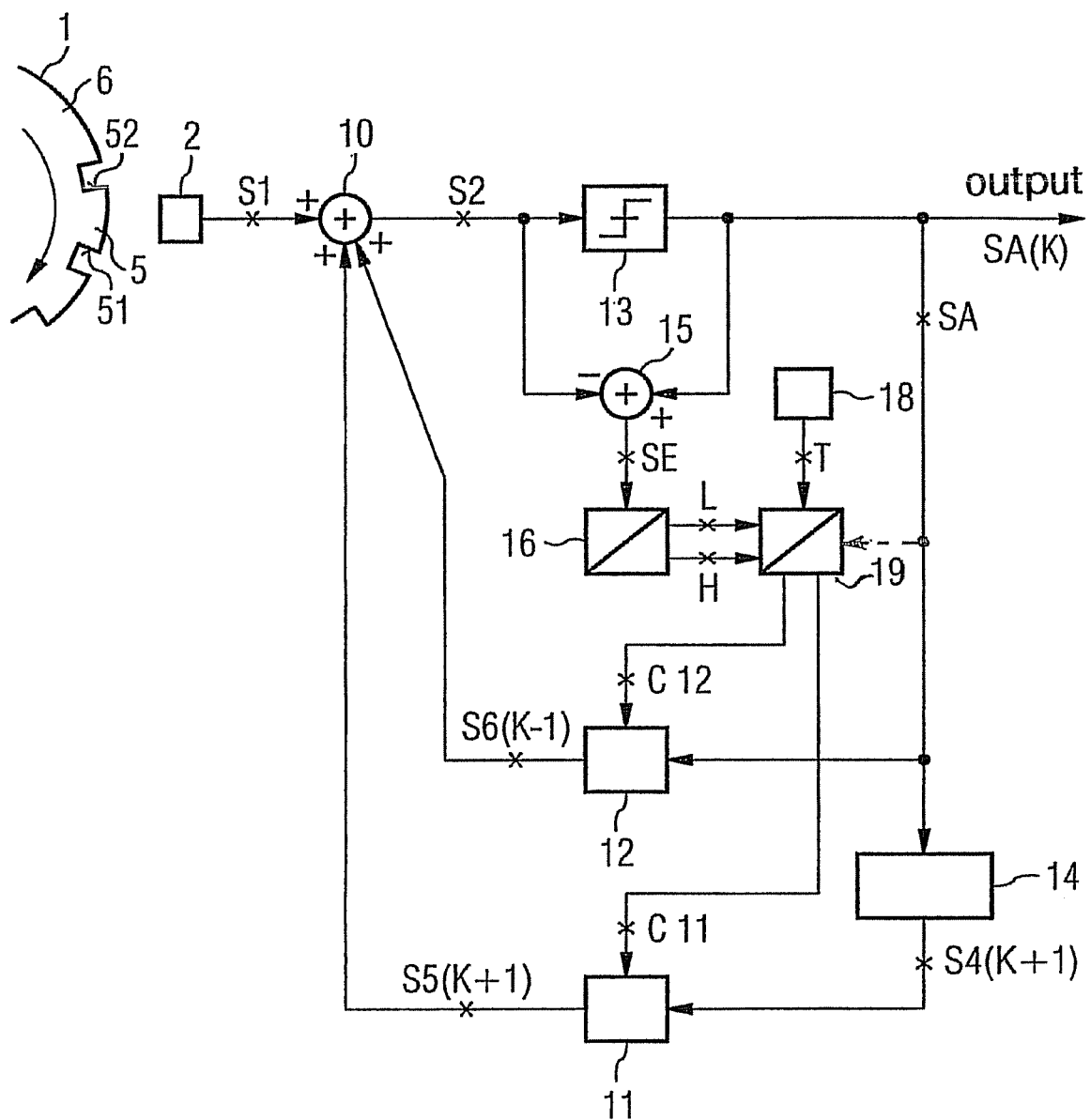
FIG. 5 illustrates another exemplary embodiment of an inventive apparatus.

FIG. 5 illustrates another embodiment. It differs from the apparatus in FIG. 4 in that the unit for estimating the transmission parameter estimates not one but rather a plurality of transmission parameters and supplies them to the processor 19. In addition, a temperature sensor 18 is also provided which is connected to the processor 19. When calculating the filter coefficients, the processor 19 in this exemplary embodiment takes account not only of the estimated transmission parameters but also of the temperature signal T from the temperature sensor 18. It goes without saying that it is also possible to take account of any other, externally measured physical variables when calculating the filter coefficients (e.g. air humidity, etc.). In addition, it is also possible to calculate other physical variables from the output SA and to make them available to the processor 19. In another embodiment, the output signal SA is supplied to the processor, which uses it to calculate the rotation speed of the rotating object 1 and takes it into account when calculating the filter coefficients.

FIG. 6 illustrates the dependency of the sensor signal S1a on the transmission parameters "air gap length" L using the example of a magnetic wheel as shown in FIG. 1a. As the air gap length increases, the received symbol in the sensor signal S1 becomes ever wider. At the same time, the influence of the intersymbol interference also becomes greater. Depending on the respective air gap length L, the filter parameters C11 and C12 need to be adjusted in order to be able to compensate correctly for the influence of the intersymbol interference.

The increase in the size of the air gap also brings about widening of the received symbol in the case of the gearwheel shown in FIG. 1b.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for evaluating a sensor signal provided by a magnetic field sensor which is arranged at a distance from an object which is rotatable about an axis of rotation comprising:
   defining an encoding pattern with a sequence of symbols, the sensor signal being dependent on the encoding pattern and at least one physical parameter;
   regenerating the symbols of the encoding pattern from a corrected sensor signal using a threshold value detector to obtain an output signal;
   generating a filtered signal from the output signal using a filter having a plurality of filter coefficients;
   superposing the sensor signal and the filtered signal to obtain the corrected sensor signal; and
   wherein the corrected sensor signal and the output signal are used to estimate the at least one physical parameter, and the filter coefficients are derived from the estimated physical parameter, and wherein the at least one physical parameter is an air gap length.

2. The method of claim 1, comprising generating an error signal from corrected sensor signal and the output signal.

3. The method of claim 2, comprising generating the error signal by additionally using the sensor signal and/or the filtered signals.

4. The method of claim 2, determining at least one physical parameter on the basis of the error signal.

5. The method of claim 2, wherein a physical model which is dependent on the at least one physical parameter and which describes the response of the sensor signal to the encoding pattern is used to calculate the estimated physical parameter such that the error signal is minimized.

6. The method of claim 5, using the physical model to calculate the filter coefficients from the estimated physical parameter.

7. The method of claim 6, recalculating the error signal and the filter coefficients at regular intervals.

8. An apparatus for evaluating a sensor signal comprising:
- a magnetic field sensor arranged at a distance from an object which is rotatable about an axis and which has an encoding pattern with a sequence of symbols, the magnetic field sensor providing the sensor signal, which is dependent on the encoding pattern and at least one physical parameter;
- a superposition unit receiving said sensor and at least one filtered signal and providing a corrected sensor signal;
- a threshold value detector which is supplied with said corrected sensor signal and which regenerates said sequence of symbols of said encoding pattern and provides it as an output signal;
- a filter unit having a plurality of filter coefficients and generating at least one of the at least one filtered signal from the output signal;
- an estimation unit for estimating the at least one physical parameter, said estimation unit being designed to estimate the at least one physical parameter from said corrected sensor signal and said output signal; and
- a processor designed to calculate said filter coefficients from said estimated physical parameter; and wherein the at least one physical parameter is an air gap length between the rotatable object and the magnetic field sensor.

9. The apparatus of claim 8, wherein a physical model being dependent on the physical parameter and describing the response of the sensor signal to the encoding pattern is implemented in the estimation unit.

10. The apparatus of claim 9, wherein the physical model is implemented in the processor for calculating the filter coefficients.

11. The apparatus of claim 8, wherein the apparatus comprises one or more additional sensors whose output signals are supplied to the processor.

12. The apparatus of claim 11, wherein at least one of the additional sensors is a temperature sensor.

13. The apparatus of claim 8, wherein the output signal is supplied to the processor.

14. A method for evaluating a sensor signal provided by a magnetic field sensor which is arranged at a distance from an object which is rotatable about an axis of rotation comprising:
- defining an encoding pattern with a sequence of symbols, the sensor signal being dependent on the encoding pattern and at least one physical parameter;
- regenerating the symbols of the encoding pattern from a corrected sensor signal using a threshold value detector to obtain an output signal;
- generating a filtered signal from the output signal using a filter having a plurality of filter coefficients;
- superposing the sensor signal and the filtered signal to obtain the corrected sensor signal;
- employing a physical model which is dependent on the at least one physical parameter and which describes the response of the sensor signal to the encoding pattern;
- generating an error signal from the corrected sensor signal and the output signal; and
- using the physical model to estimate the at least one physical parameter based on the error signal and to derive filter coefficients such that the error signal is minimized; wherein the at least one physical parameter comprises a magnetic field strength.

* * * * *

UNITED STATES PATENT AND TRADEMARK OFFICE
CERTIFICATE OF CORRECTION

PATENT NO. : 7,541,802 B2  Page 1 of 1
APPLICATION NO. : 11/636178
DATED : June 2, 2009
INVENTOR(S) : Hainz et al.

It is certified that error appears in the above-identified patent and that said Letters Patent is hereby corrected as shown below:

Column 9, line 10, delete "sensor and" and insert in place thereof --sensor signal and--.

Signed and Sealed this

Twenty-fourth Day of November, 2009

David J. Kappos
*Director of the United States Patent and Trademark Office*